(No Model.)

J. P. GUÉNO.
STUBBLE CUTTER.

No. 307,542.  Patented Nov. 4, 1884.

WITNESSES:
Francis McArdle.
C. Sedgwick.

INVENTOR:
J. P. Guéno
BY Munn & Co.
ATTORNEYS.

UNITED STATES PATENT OFFICE.

JOSEPH PIERRE GUÉNO, OF TERRE BONNE PARISH, LOUISIANA.

STUBBLE-CUTTER.

SPECIFICATION forming part of Letters Patent No. 307,542, dated November 4, 1884.

Application filed May 9, 1884. (No model.)

*To all whom it may concern:*

Be it known that I, JOSEPH PIERRE GUÉNO, of the parish of Terre Bonne and State of Louisiana, have invented a new and Improved Stubble-Cutter, of which the following is a full, clear, and exact description.

The object of my invention is to provide a simple and efficient implement for cutting stubble and stalks of various kinds; and it consists of the combinations of parts and their construction, substantially as hereinafter fully set forth and claimed.

Reference is to be had to the accompanying drawings, forming part of this specification, in which similar letters of reference indicate corresponding parts in all the figures.

Figure 1:
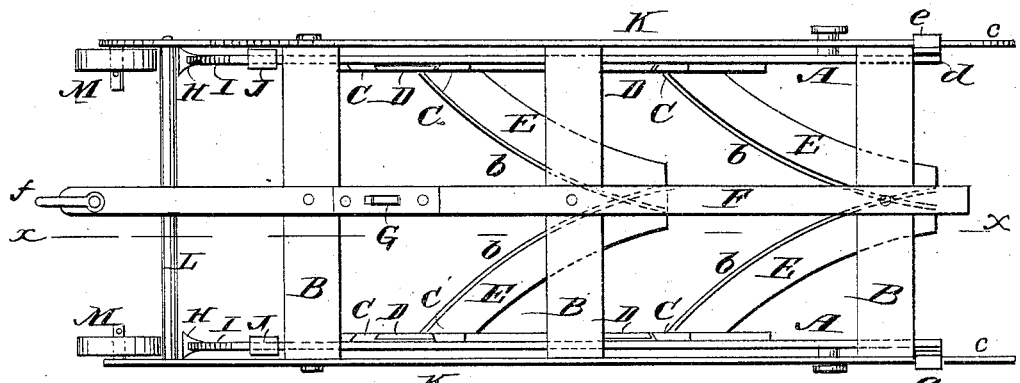
Figure 2:
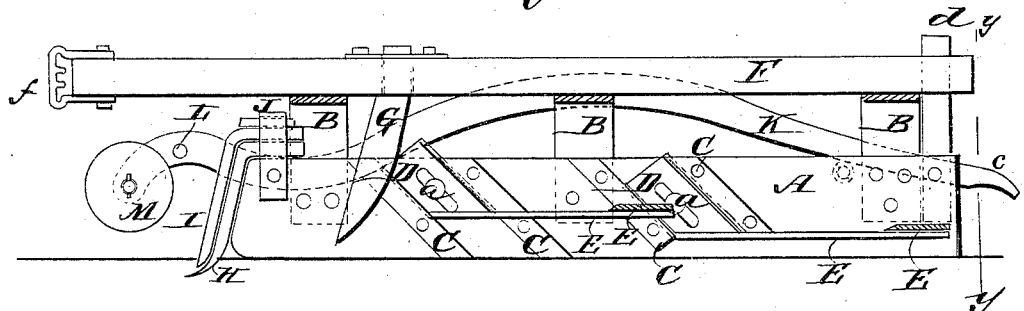
Figure 3:
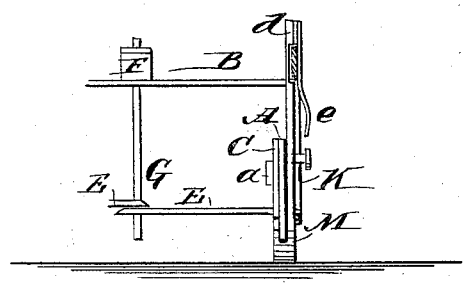

Figure 1 is a plan view of my improved stubble-cutter. Fig. 2 is a longitudinal section taken on line $x\,x$ in Fig. 1, and Fig. 3 is a transverse section taken on line $y\,y$ in Fig. 2.

Two parallel side bars, A, are connected by three cross-bars, B, each bent twice at right angles, and attached to the outside of the said bars.

To the inner surface of each side bar, A, are secured two pairs of oblique strips, C, inclining downward toward the rear of the implement. Between each pair of oblique strips is placed the slotted shank D of a curved knife, E. The shank D is held in place by a bolt, $a$, passing through the slot and through a hole in the bar A. The knives E extend rearward, with their convex cutting-edges $b$ in front, and with the ends of opposite knives overlapping each other. The knives are adjustable up or down, and in use I generally arrange the forward knife the highest. A beam, F, is secured along the middle of the cross-bars B, and carries in front of the forward pair of knives E a colter, G, and an angled chisel-edged tooth, H, and colter I are secured by a clip, J, to the upper edge of each side bar, A, at the forward end, and extend downward a short distance below the lower edge of the side bar. Levers K, pivoted to the vertical ends of the forward cross-bar, are connected near their forward ends by the cross-bar L, and at their forward extremities they carry ground-wheels M. The rear ends of the levers K extend beyond the rear end of the side bars, A, and have handles $c$ formed on them. Notches in arms $d$, extending upward from the bars A, receive the levers K when raised, and the levers are held in place in the notches by the curved springs $e$, under which the levers must pass to reach the notches.

The implement is drawn forward by horses hitched to the clevis $f$ on the forward end of the beam F, and the colters cut and break the roots of the stalks, while the knives E cut such as may be left standing by the colters.

Having thus described my invention, I claim as new and desire to secure by Letters Patent—

The combination, with the side bars, A, and knives E, attached thereto, of the chisel-edged tooth H and colter I, as described.

JOSEPH PIERRE GUÉNO.

Witnesses:
ERNEST A. HEPLER,
ALEX. ROVIRA.